(12) United States Patent
Pedersen et al.

(10) Patent No.: US 11,576,001 B2
(45) Date of Patent: Feb. 7, 2023

(54) HEARING AID COMPRISING BINAURAL PROCESSING AND A BINAURAL HEARING AID SYSTEM

(71) Applicant: Oticon A/S, Smørum (DK)

(72) Inventors: Michael Syskind Pedersen, Smørum (DK); Nels Hede Rohde, Smørum (DK); Thomas Bentsen, Smørum (DK); Anders Brødløs Olsen, Smørum (DK); Jesper Jensen, Smørum (DK); Peter Mølgaard Sørensen, Smørum (DK); Gusztáv Lőcsei, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 17/361,615

(22) Filed: Jun. 29, 2021

(65) Prior Publication Data

US 2021/0409878 A1 Dec. 30, 2021

(30) Foreign Application Priority Data

Jun. 30, 2020 (EP) ..................................... 20183034

(51) Int. Cl.
*H04R 25/00* (2006.01)
*G10L 15/22* (2006.01)

(52) U.S. Cl.
CPC ............ *H04R 25/552* (2013.01); *G10L 15/22* (2013.01); *H04R 25/554* (2013.01); *G10L 2015/223* (2013.01)

(58) Field of Classification Search
CPC ... G10L 15/22; G10L 2015/223; H04R 25/30; H04R 25/552; H04R 25/554; H04R 25/603; H04R 2225/61

USPC .................................................. 381/23.1, 312
See application file for complete search history.

(56) References Cited

U.S. PATENT DOCUMENTS

| | | | |
|---|---|---|---|
| 2010/0260364 A1* | 10/2010 | Merks ................. | H04R 25/505 381/328 |
| 2018/0146307 A1* | 5/2018 | Petersen .............. | H04R 25/552 |
| 2019/0075406 A1 | 3/2019 | Petersen et al. | |
| 2019/0149927 A1 | 5/2019 | Zhang | |
| 2019/0182607 A1 | 6/2019 | Pedersen | |
| 2020/0202889 A1* | 6/2020 | Piechowiak ......... | H04R 25/405 |

FOREIGN PATENT DOCUMENTS

EP 3 726 856 A1 10/2020

\* cited by examiner

*Primary Examiner* — Harry S Hong
(74) *Attorney, Agent, or Firm* — Birch, Stewart, Kolasch & Birch, LLP

(57) ABSTRACT

A hearing aid comprises an input unit providing an electric input signal representing sound, a wake word detector configured identifying a particular wake word based on said electric input signal, and providing a wake word control signal indicative of whether, or with what probability, the wake word is detected, or an own voice detector estimating whether, or with what probability, the electric input signal originates from the voice of the user and providing an own voice control signal indicative thereof, transceiver circuitry establishing a communication link to another hearing aid allowing the transmission and/or reception of the electric input signal to/from the other hearing aid, and a preprocessor controlling the transceiver circuitry in dependence of the wake word control signal or the own voice control signal. A binaural hearing aid system and a method of operating a hearing aid are further disclosed.

22 Claims, 6 Drawing Sheets

HEARING AID COMPRISING BINAURAL PROCESSING AND A BINAURAL HEARING AID SYSTEM

SUMMARY

The present application deals with hearing devices, e.g. hearing aids, in particular with the use of voice control to activate functional features in a hearing aid, e.g. to activate binaural processing in a binaural hearing aid system.

An important application for hearing devices is wake word or keyword spotting. A wake word is a specific word (e.g. a particular one of a multitude of specific keywords) spoken by the hearing device user, e.g. to enable (or disable) functionality of the hearing device or a device or system in communication with the hearing device. Wake word detection or keyword spotting may soon be an integral part of a hearing device.

A detected wake word or a keyword may enable more computationally exhaustive calculations in an external device. A cheap (i.e. computationally and/or power consumption-friendly) way of detecting a wake word in a binaural hearing aid system is a local detection of the wake word in one of the hearing instruments. A more accurate and more expensive way of detecting a wake word is a detection based on microphones from hearing instruments at both ears as such a detection requires binaural exchange of data (and the, particularly wireless, transmission of data between hearing instruments is a relatively large power consumer in a binaural hearing system). For that reason, it is important only to transmit audio data when it is necessary. Having access to binaural audio signals may enable the possibility of further processing of signals (and thus e.g. to achieve a better confidence level of a derived parameter, e.g. a wake word/keyword, and e.g.—based thereon—to activate binaural noise reduction, e.g. including binaural directionality).

The possibility of binaural processing of the hearing device microphones may be advantageous as binaural noise reduction may be applied in order to attenuate background noise, hereby improving the possibility for correct detection of wake word/keyword/ or for improved speech recognition.

In an aspect, a hearing aid (or a binaural hearing aid system) is provide configured to start a transmission of audio data (to another device, e.g. another hearing aid) and to stop transmission of audio data (to another device, e.g. another hearing aid) based on asymmetric conditions. A start of transmission may e.g. be based on detection of a wake word and/or a detection of the user's own voice. A stop of transmission may e.g. be based on a termination of a detection of the user's own voice, e.g. on a non-detection of the user's own voice for a certain amount of time, e.g. ≥5 s or ≥10 s. A stop of transmission may e.g. be based on a non-detection of the user's own voice for a certain amount of time and a non-detection or the wake word (or the detection of a particular 'stop word' (e.g. 'Stop transmission').

A Hearing Aid (e.g. of a Binaural Hearing Aid System):

In an aspect of the present application, a hearing aid (e.g. of a binaural hearing aid system) configured to be worn by a user is provided. The hearing aid may comprise
- an input unit configured to provide an electric input signal representing sound,
- a wake word detector configured to identify a particular wake word based on said electric input signal, or a signal derived therefrom, and to provide a wake word control signal indicative of whether or not, or with what probability, said wake word is detected, and/or
- an own voice detector configured to estimate whether or not, or with what probability, the electric input signal or a signal derived therefrom originates from the voice of the user and to provide an own voice control signal indicative thereof. The hearing aid may further comprise transceiver circuitry configured to establish a communication link to another hearing aid (e.g. the other hearing aid of the binaural hearing aid system) allowing the transmission of said electric input signal, or a signal derived therefrom, to said another hearing aid and/or the reception of an electric input signal, or a signal derived therefrom, from said another hearing aid. The hearing aid may further comprise a pre-processor configured to control said transceiver circuitry in dependence of said wake word control signal and/or in dependence of said own voice control signal.

Thereby an improved control of a hearing aid or a binaural hearing aid system may be provided.

The term 'input unit' may be substituted by 'input stage' or 'input section' or input block' or 'input interface', or similar structure for providing electric input signals or data representative of sound. The input unit may comprise an input transducer, e.g. a microphone, for providing the electric input signal. The input unit may comprise a wireless receiver for receiving audio signals from another device, e.g. from 'the another device', e.g. from a contralateral hearing aid of a binaural hearing aid system, or from an external processing device. The input unit may comprise an analogue to digital converter for providing the electric input signal as a stream if digitized samples (i.e. as a digitized electric input signal). The input unit may comprise an analysis filter bank for providing the digitized electric input signal in a time frequency representation (k, l), e.g. as successive time frames, each time frame comprising a multitude of time-frequency units, each time frequency unit comprising a (e.g. complex) value of the signal at a given frequency k and time l. A given time frame/comprising time frequency units (k, l) spanning frequency indices k=l, K constitutes an estimated spectrum of the electric input signal at time index l.

The pre-processor may be configured to enable and disable the transceiver circuitry in dependence of the wake word control signal or in dependence of the own voice control signal.

The 'another hearing aid' may be a contralateral hearing aid of a binaural hearing aid system.

Thereby a trigger procedure for enabling binaural processing is provided. A first, local trigger stage enabling binaural communication may be based a) on the detection of a specific keyword (here termed a wake word) or b) on the detection of the user's own voice. A second, binaural trigger stage may enable other functionality of the hearing aid or the binaural hearing aid system or trigger a transmission of data to an external device, e.g. for further processing or for enabling functionality of the external device or other devices or systems (e.g. via a network). The binaural stage may e.g. be based on wake word detection or own voice detection based on binaural signals. Binaurally founded wake word detection or own voice detection may e.g. be based on A) a comparison of two local wake word control signals or of two local own voice control signals, respectively, or on B) respective binaurally generated wake word control signals or own voice control signals determined from electric input signals, or signals derived therefrom, from both hearing aids of a binaural hearing aid system.

The use of own voice detection as a local trigger for enabling binaural communication may e.g. be relevant for a telephone mode of operation of the hearing aid(s), in which case an improved own voice detection and/or own voice estimation based on binaural signals may be advantageous. Likewise, a general keyword spotting system of a voice control interface may benefit from local wake word detection and/or own voice detection to trigger a binaural processing of electric input signals or signals derived therefrom.

The term 'or a signal derived therefrom' in the expression 'the electric input signal, or a signal derived therefrom' may e.g. be taken to mean a processed version thereof, e.g. a spectrum (e.g. a magnitude spectrum) of the electric input signal, or an envelope of the electric input signal, or a filtered part of the electric input signal, or a down-sampled version of the electric input signal, etc.

The hearing aid may comprise a binaural low-power mode of the transceiver circuitry (to save power). In the low power mode, only control signals are exchanged between the hearing aid and the 'another hearing aid'. Such control signals may be signals used for synchronizing basic functions of a binaural hearing system (comprising the hearing aid and the 'another hearing aid'), e.g. regarding basic timing information (e.g. clock), noise reduction (e.g. SNR, level), etc. In the low power mode, audio signals are not transmitted (or received). The hearing aid may be configured to enter the binaural low-power mode when binaural communication according to the present disclosure is not enabled.

The hearing aid may be configured to enter an 'audio exchange mode' including the start of transmitting the electric input signal(s), or signal(s) derived therefrom, to the another hearing aid in dependence of the wake word control signal or in dependence of said own voice control signal (e.g. when the wake word or the user's own voice has been detected, or has been detected with a probability above a threshold value). The hearing aid may be configured to stop transmitting after a certain elapsed time. The hearing aid may be configured to stop transmitting in dependence of the own voice control signal (e.g. when the user's own voice is not detected (or is detected with a probability below a threshold value), or when a certain time has elapsed since the user's own voice was detected, e.g. detected with a probability above a threshold value). The hearing aid may be configured to stop transmitting in dependence of a particular stop word being detected by the wake word detector. The 'stop word' may be a unique word (e.g. 'stop') intended to bring the transceiver circuitry into a low-power (non-audio exchange) mode. The 'stop word' may be identical to the wake word. The hearing aid may be configured to shift between two modes of operation in dependence of the detection the wake word (possibly when it is detected that it is spoken by the user of the hearing aid). The hearing aid may be configured to shift from audio-exchange mode to low-power mode upon detection of the wake word. The hearing aid may be configured to shift between two modes of operation triggered by silence or the absence of voice/own voice for a certain amount of time.

A start of transmission and a stop of transmission may be based on asymmetric conditions. A start of transmission may e.g. be based on detection of a wake word and/or a detection of the user's own voice. A stop of transmission may e.g. be based on a termination of a detection of the user's own voice, e.g. on a non-detection of the user's own voice for a certain amount of time, e.g. ≥5 s or ≥10 s.

The hearing aid may comprise a buffer configured to store a time segment of said electric input signal or a signal derived therefrom. The buffer may be configured to allow a time segment including said wake word to be stored. Thereby the hearing aid will be able to include the wake word in the data stream transmitted to the 'another hearing aid'. The time segment may cover a time period larger than 500 ms, e.g. in the range of 500 ms to 2 s.

The detection of the wake word may be dependent on the simultaneous detection of the user's own voice. In other words, the hearing aid may comprise a wake word detector as well as an own voice detector. In this embodiment, the wake word must be detected simultaneously with the user's own voice (i.e. the wake word spoken by the user must be detected) to enable establishment of the communication link to the other hearing aid (='the another hearing aid').

Thereby an increased confidence of the wake word detection may be provided.

The input unit may be configured to provide at least two electric input signals representing said sound. The input unit may comprise at least two input transducers, e.g. microphones, for providing the at least two electric input signals. The at least two input transducers may comprise an accelerometer for picking up vibrations in tissue or flesh or bone of the user.

At least one of the electric input signals may be wirelessly received. At least one of the electric input signals may be received from another device, e.g. a wireless microphone (e.g. of device worn by the user, e.g. a smartphone), e.g. located at an opposite ear of the user compared to the hearing aid, e.g. in another hearing aid located at the other ear of the user (e.g. in another (='the another', contralateral) hearing aid of a binaural hearing aid system).

The hearing aid may comprise a directional system comprising an own voice beamformer configured to focus on the user's mouth, when the hearing aid is mounted on the user. The own voice beamformer may be used in connection with the own voice detection to decide on the presence (or presence probability) of the user's own voice at a given point in time. The own voice beamformer may be configured to provide an estimate of the user's own voice at a given point in time, e.g. in a particular mode of operation. However, the hearing aid may also be configured to provide an estimate of the user's own voice to the wake word detector, e.g. to increase the quality of the detection (because the wake word is intended to be spoken by the user).

The own voice beamformer may be based on local electric input signals or on binaural signals, or on signals derived therefrom, in dependence of said wake word control signal and/or on said own voice control signal. Here the 'own voice beamformer' may be the beamformed signal (e.g. to be listened to by the user, to be further analyzed, or to be transmitted to another device, e.g. the contralateral hearing aid of the binaural hearing aid system).

The hearing aid may be configured to provide signals from one or more detectors influencing (e.g. controlling) the value of the wake word control signal or the own voice control signal at a given point in time. The one or more detectors may be located in the hearing aid and/or in another device, e.g. in a contralateral hearing aid of a binaural hearing aid system. The one or more detectors may comprise a movement detector (e.g. an accelerometer), or a voice activity detector (e.g. of another device), or an own voice detector of another device, e.g. worn by the user, e.g. of a contralateral hearing aid of a binaural hearing aid system.

The hearing aid may be configured to transmit the wake word control signal and/or the own voice control signal to the another hearing aid (e.g. the contralateral hearing aid of a binaural hearing aid system), and/or to receive a wake word control signal or an own voice control signal from said another hearing aid (e.g. the e.g. the contralateral hearing aid of a binaural hearing aid system).

The hearing aid may comprise a binaural processor configured to process signals from the hearing aid as well as corresponding signals received from the another hearing aid (e.g. the contralateral hearing aid of the binaural hearing aid system). The binaural processor may be configured to compare the wake word (or own voice) control signal and a wake word (or own voice) control signal received from the another hearing aid and to provide a binaural wake word (or own voice) control signal indicative of whether or not, or with what probability, the wake word (or the user's own voice) is detected.

The 'another hearing aid' may be a contralateral hearing aid of a binaural hearing aid system. A combination between current values of the wake word or own voice control signals of local and contralateral origin may be a logic combination (e.g. based on an 'AND' operation in case of binary wake word control signals), or based on a multiplication of current values of said wake word control signals (in case they are represented by probabilities), or be a weighted combination (e.g. average) of the respective wake word or own voice control signal.

The binaural processor may be configured to provide, respectively,
a binaural wake word control signal in dependence of
the wake word control signal of the (e.g. ipsi-lateral) hearing aid, and
the wake word control signal received from the other hearing aid (e.g. the contralateral hearing aid of the binaural hearing aid system); or
a binaural own voice control signal in dependence of
the own voice control signal of the (e.g. ipsi-lateral) hearing aid, and
the own voice control signal received from the other hearing aid (e.g. the contralateral hearing aid of the binaural hearing aid system).

The binaural processor may be configured to provide a binaural wake word control signal or a binaural own voice control signal, respectively, in dependence of
the electric input signal, or a signal or signals derived therefrom, of the (e.g. ipsi-lateral) hearing aid, and
an electric input signal, or a signal or signals derived therefrom, received from the other hearing aid (e.g. the contralateral hearing aid of the binaural hearing aid system).

The binaural processor may be configured to control functionality (e.g. processing) of the hearing aid (or the binaural hearing aid system, which the hearing aid may form part of) in dependence of the binaural wake word control signal and/or the binaural own voice control signal The binaural processor may be configured to trigger transmission of data from the hearing aid to an external device or system in dependence of the binaural wake word control signal and/or the binaural own voice control signal The external device or system may comprise a cellphone, e.g. a smartphone or similar communication device, e.g. a tablet or laptop computer (e.g. connected to a communication network). The external device or system may comprise a separate processing device, e.g. including a remote control device, e.g. comprising a user interface. The external device or system may be configured to provide (additional) processing power to the hearing aid or to the binaural hearing aid system, e.g. controlled by the binaural processor, e.g. via the binaural wake word control signal and/or the binaural own voice control signal. Data transmitted to the external device or system may comprise the electric input signal (from the input unit, e.g. a microphone signal comprising sound from the environment, e.g. the user's own voice). The data (e.g. comprising own voice) may e.g. be transmitted to a speech analyzer in the external device (e.g. processing device) or system (e.g. a network (e.g. the Internet) and associated servers (e.g. 'the cloud')), e.g. for identifying keywords of a voice control interface in the data, and possibly for reacting to commands associated with such keywords. The results of such analysis or of actions following the analysis may be reported (transmitted) back to the hearing aid or binaural hearing aid system (or to another device or system).

The external device or system may comprise a contralateral hearing aid of a binaural hearing aid system.

The hearing aid may be constituted by or comprise an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid, or a loudspeaker (receiver') of an air-conduction type hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may comprise a synthesis filter bank for converting a (e.g. processed) signal in a time frequency representation (k, l) to a time-domain signal. The output unit may comprise a digital to analogue converter for providing the (digitized) electric output signal as an analogue electric output signal (e.g. before it is presented to an output transducer).

The hearing aid comprises an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional system, e.g. a directional microphone system, adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology). The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, e.g. less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$, (or $x[n]$) at discrete points in time $t_n$, (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$ e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively, or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain)

The hearing aid may comprise a voice activity detector (VAD) for estimating whether (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may further comprise other relevant functionality for the application in question, e.g. compression, noise reduction, feedback control, etc.

The hearing aid may comprise a hearing instrument, e.g. a hearing instrument adapted for being located at the ear or fully or partially in the ear canal of a user, e.g. a headset, an earphone, an ear protection device or a combination thereof.

Use:

In an aspect, use of a hearing aid as described above, in the 'detailed description of embodiments' and in the claims, is moreover provided. Use may be provided in a system comprising one or more hearing aids (e.g. hearing instruments), e.g. in a binaural hearing aid system.

A Method:

In an aspect, a method of operating a hearing aid (e.g. a contra-lateral hearing aid of a binaural hearing aid system) configured to be worn by a user is provided. The method may comprise providing an electric input signal representing sound, identifying a particular wake word based on said electric input signal, or a signal derived therefrom, and providing a wake word control signal indicative of whether or not, or with what probability, said wake word is detected, and/or estimating whether or not, or with what probability, the electric input signal or a signal derived therefrom, originates from the voice of the user and providing an own voice control signal indicative thereof.

The method may further comprise establishing a communication link to another hearing aid (e.g. a contra-lateral hearing aid of a binaural hearing aid system) allowing the transmission of said electric input signal, or a signal derived therefrom, to said another hearing aid and/or the reception of an electric input signal, or a signal derived therefrom, from said another hearing aid, and controlling said transmission and/or said reception in dependence of said wake word control signal and/or in dependence of said own voice control signal.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

A Binaural Hearing Aid System:

In a further aspect, a binaural hearing aid system comprising respective first and second hearing aids as described above, in the 'detailed description of embodiments', is moreover provided.

Each of the first and second hearing aids of the binaural hearing aid system may comprise
 an input unit configured to provide an electric input signal representing sound,
 a wake word detector configured to identify a particular wake word based on said electric input signal, or a signal derived therefrom, and to provide a wake word control signal indicative of whether or not, or with what probability, said wake word is detected, and/or
 an own voice detector configured to estimate whether or not, or with what probability, the electric input signal or a signal derived therefrom originates from the voice of the user and to provide an own voice control signal indicative thereof.

Each or the first and second hearing aids may further comprise transceiver circuitry configured to establish a communication link to the other hearing aid allowing the transmission of said electric input signal, or a signal or signals derived therefrom, to said other hearing aid and/or the reception of an electric input signal, or a signal derived therefrom, from said other hearing aid. Each or the first and second hearing aids may further comprise a pre-processor configured to control said transceiver circuitry in dependence of said wake word control signal and/or in dependence of said own voice control signal.

The transceiver circuitry of the first and second hearing aids may be configured to establish a (e.g. the) communication link between the first and second hearing aids. The communication link may be based on a standardized or proprietary protocol, and be based on radiated fields (e.g. Bluetooth and similar technology, e.g. Ultra WideBand (UWB) technology) or near-field communication (e.g. inductive links).

At least one of the first and second hearing aids may comprise a binaural processor configured to process signals from the hearing aid in question (the ipsi-lateral hearing aid) as well as corresponding signals received from the other (contra-lateral) hearing aid of the binaural hearing aid system. The binaural processor may be configured to compare the wake word (or own voice) control signal and/or a wake word (or own voice) control signal received from the other hearing aid and to provide a binaural wake word (and/or own voice) control signal indicative of whether or not, or with what probability, the wake word (and/or the user's own voice) is detected.

Thereby a trigger procedure for enabling binaural processing is provided. A first, local trigger stage enabling binaural communication may be based a) on the detection of a specific keyword (here termed a wake word) and/or b) on the detection of the user's own voice. A second, binaural trigger stage may enable other functionality of the hearing aid or the binaural hearing aid system or trigger a transmission of data to an external device, e.g. for further processing or for enabling functionality of the external device or other devices or systems (e.g. via a network). The binaural stage may e.g. be based on wake word detection and/or own voice detection based on binaural signals. Binaurally founded wake word detection and/or own voice detection may e.g. be based on A) a comparison of two local wake word control signals and/or of two local own voice control signals, respectively, or on B) respective binaurally generated wake word control signals and/or own voice control signals determined from electric input signals, or signals derived therefrom, from both hearing aids of the binaural hearing aid system.

A binaural processor of at least one of said first and second hearing aids may be configured to enable transmission of said electric input signal, or a signal derived therefrom, to an external processing device in case said binaural wake word control signal or said own voice control signal indicates that said wake word and/or the user's own voice, respectively, has been detected or has been detected with a probability above a certain threshold value. The electric signal of one of the first and second hearing aids may contain said wake word (and subsequent audio data) for further processing by the external processing device, e.g. a smartphone, or a server, e.g. a cloud-based server. The wake word may be further verified by said external processing device. The external processing device may transmit an acknowledgement control signal to the at least one hearing aid that indicates a confirmation or non-confirmation of the wake word detection. The at least one hearing aid may be configured to continue or to stop transmission of said electric input signal in dependence of said acknowledgement control signal from the external processing device.

Start and stop of transmission may be based on asymmetric decisions (i.e. e.g. start based on a wake word, and stop of transmission based on own voice detection (OVD), e.g. termination of OVD, e.g. no own voice detection for a certain amount of time, e.g. ≥5 s or 10 s.

A calibration of an own voice beamformer of said hearing binaural aid system may be initiated in dependence of a binaurally determined own voice control signal. Acoustic parameters related to own voice detection/pick-up, e.g. a steering vector (and based thereon, appropriate own voice beamformer weights) of a local own voice beamformer (e.g. an own voice cancelling beamformer) may be updated based on binaural own voice detection. Local updates may e.g. be based on local detection of own voice OV AND simultaneously detection of a wake word (e.g. dependent on a probability of such detection being larger than a minimum threshold value). The detection of the wake word may be based on local signals or binaurally based.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on a cellular phone, e.g. a smartphone, or on another portable device allowing communication with said hearing aid or said hearing system.

Definitions:

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid or may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence of the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some hearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system) and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as binaural hearing aid systems and associated applications, e.g. communication systems.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids, in particular to a wake word-detection-based enablement of binaural communication in a binaural hearing aid system.

Figure 1:
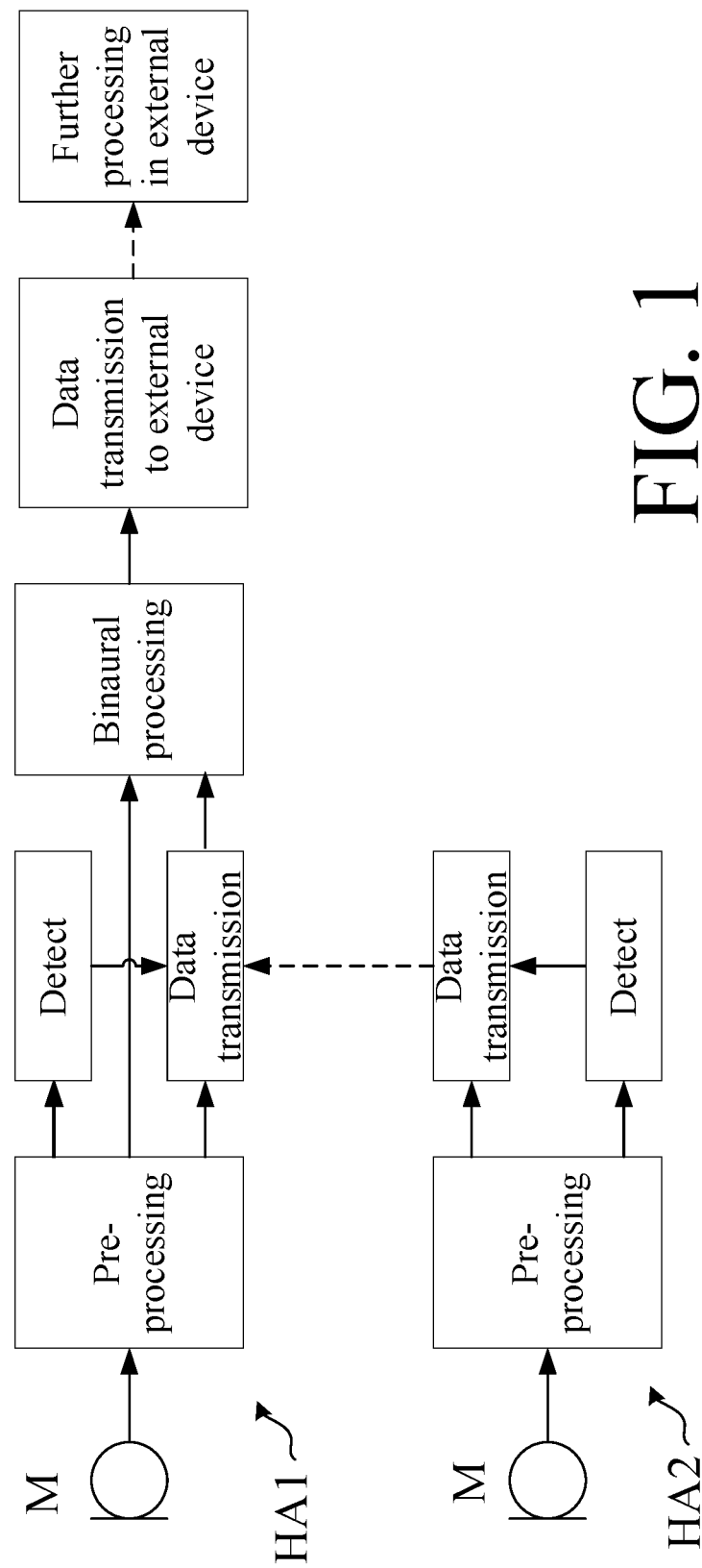
FIG. 1 shows a first embodiment of a binaural hearing aid system in communication with an external device according to the present disclosure.

The present disclosure deals with a binaural hearing aid system, where the enabling of the binaural communication is triggered by a locally detected wake word. This is illustrated in FIG. 1. FIG. 1 shows a first embodiment of a binaural hearing aid system in communication with an external device according to the present disclosure.

In each hearing instrument (HA1, HA2), an own voice wake word detector (Detect) is running locally (or just a wake word detector (preferably only detecting a wake word when uttered by the user)). If a wake word is detected, the audio signal from one instrument (HA2) is transmitted to the other hearing instrument (HA1) in order to enhance a signal based on the microphones (M) from both hearing instruments (HA1, HA2).

Each instrument (HA1, HA2) may have a local wake word detector (Detect), which may be based on the instrument's local microphones (M). As a local wake word detector solely relies on the instrument's local microphones, a detector, e.g., a users' own voice-activity detector, relying on microphones (and additional sensors) from both instruments is expected to be more accurate than a local detector, because it has access to more information. In addition, a combination of binaural microphone signals may enable further speech enhancement, e.g., of the users' own voice-signal, as a binaural own voice enhancing beamformer (using more microphone signals than a local own voice beamformer) may be obtained from a combination of the binaural microphone signals. A combined binaural signal, e.g. an enhanced own voice signal, may be transmitted to an external device such as a smartphone for even further processing (such as keyword spotting or further verification of the wake word).

A full-band version of the electric input signal comprising sound from the environment may be transmitted to the external device (or between the hearing aids). However, only selected parts of the audio signal may be transmitted binaurally. It may be a high-pass filtered or low-pass filtered or a band-pass filtered part of the full-band signal. It may as well be a signal in the frequency domain e g a signal consisting of (complex-numbered) frequency bands (if re-synthesis of the transmitted signal is not necessary, the frequency bands may even be combined into broader frequency channels e.g. by summing across a range of frequency bands).

Likewise, the transmitted signal may be an amplitude spectrum. The transmitted signal may as well be down-sampled (cf. e.g. US2019182607A1).

Figure 2:
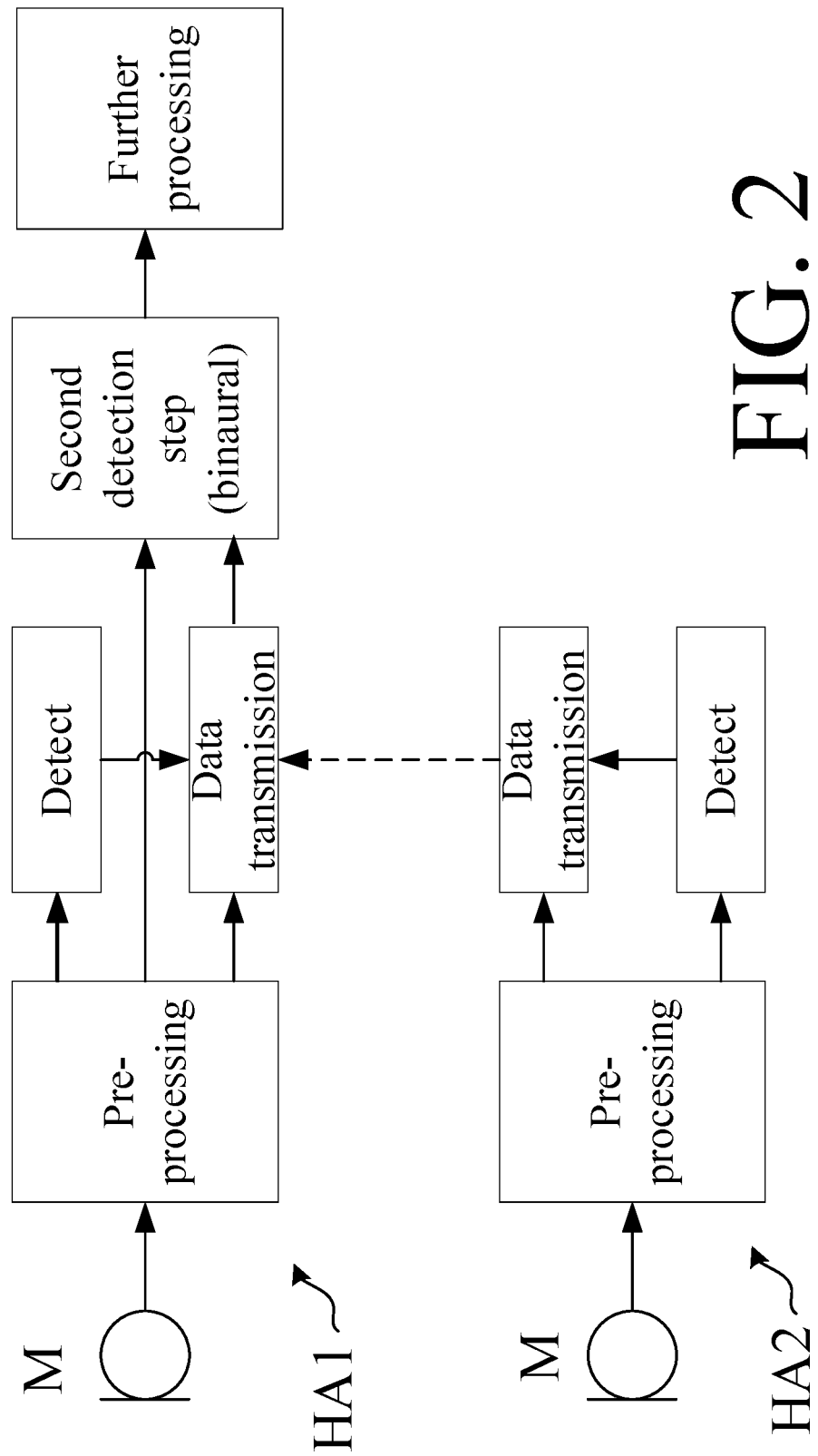
FIG. 2 shows a second embodiment of a binaural hearing aid system according to the present disclosure.

Likewise, when binaural microphone signals are available, the detection of the wake word can be verified based on the binaural microphone signals. This is shown in FIG. 2. FIG. 2 shows a second embodiment of a binaural hearing aid system according to the present disclosure. By having a second verification step based on binaural microphone signals, a higher accuracy can be obtained.

Preferably, a wake word detector is used to enable binaural communication, but in principle other local detectors may as well trigger the binaural communication. Such detectors could be a local own voice detector or a local on/off detector or combination of different detectors (e.g. the combination of a local own voice detector and a local wake word detector). Detectors may as well be based on other or additional sensors such as e.g. an accelerometer. A "phone call" detector (e.g. a detector of a specific 'telephone mode' of operation of the hearing aid having been entered) may as well trigger binaural communication, e.g. to enable the generation of a beamformed signal created from input signals from both hearing instruments (to thereby provide a better SNR of the beamformed signal).

Figure 3A:
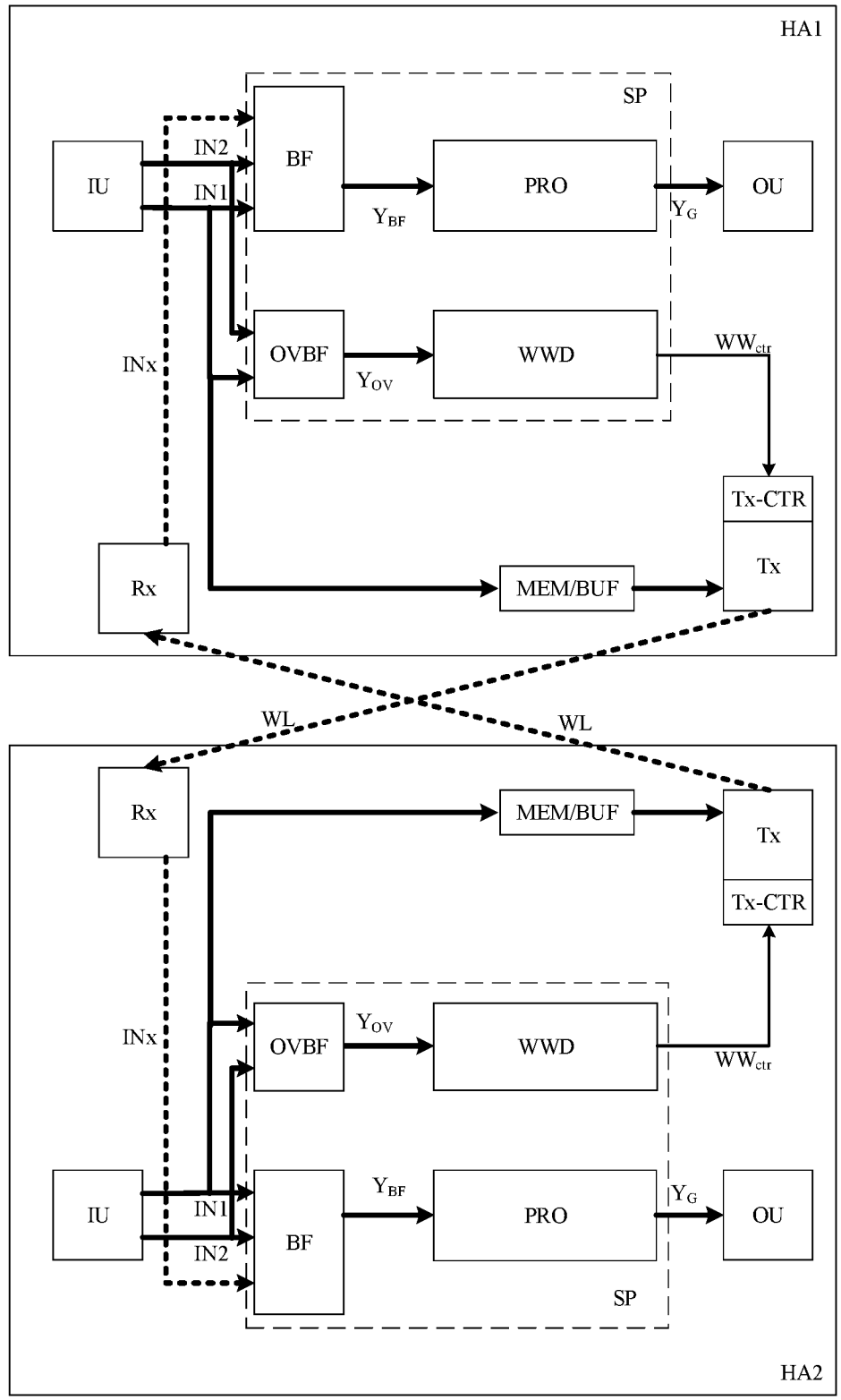
FIG. 3A shows a first embodiment of a binaural hearing aid system comprising first and second hearing aids according to the present disclosure.

FIG. 3A shows an embodiment of a binaural hearing aid system comprising first and second hearing aids according to the present disclosure. Each of the first and second hearing aids (HA1, HA2) comprises a wake word detector (WWD) which provides a wake word control signal ($WW_{ctr}$) in dependence of 'local' electric input signals (here in dependence of beamformed signal ($Y_{OV}$) provided by an own voice beamformer (OVBF) focusing on the user's mouth and generated from first and second electric input signals (IN1, IN2) provided by an input unit (UI). The first and second electric input signals (IN1, IN2) both originate from the hearing aid itself, e.g. from two input transducers located in the hearing aid (i.e. no signals from the other hearing aid is/are involved in the local wake- word detection). The wake word control signal ($WW_{ctr}$) is fed to a transmit controller (Tx-CTR) for controlling the transmitter (Tx). The wake word control signal ($WW_{ctr}$) may likewise be fed to a receive controller (not shown) for controlling the receiver (Rx). The first and second transmitters (Tx) and first and second receivers (Rx) of the first and second hearing aids, respectively, together form first and second transceivers for establishing a wireless link (WL) between the first and second hearing aids allowing signals (including audio signals) to be exchanged between them. When the wake word control signal ($WW_{ctr}$) indicates that the wake word (e.g. 'Binaural mode') for binaural processing has been detected by the wake word detector, at least one signal (here an electric input signal (IN1)) from the hearing aid in question (e.g. HA1) is transmitted to the contralateral hearing aid (e.g. HA2) (and reception of a corresponding signal (e.g. an electric input signal, or selected frequency range(s) thereof) from the contralateral hearing aid (e.g. HA2) may thereby be enabled). The signal or signals (here IN1) transmitted from one of the hearing aids to the other is passed through a buffer (MEM/BUF), e.g. to allow start sequence of interest, e.g. a wake word, to be included in the transmitted data stream. The thereby delayed data stream is forwarded to the transmitter Tx, transmitted, and received in a receiver (Rx) of the other hearing aid (here HA2) and used in a binaural processing unit, here beamformer BF, cf. signal Inx which is fed to beamformer (BF) of the forward path of the hearing aid in question. The locally generated electric input signals (IN1, IN2) representing sound at the hearing aid in question (HA1, HA2) are fed to the respective beamformers (BF) together with the electric input signal(s) (here Inx) received from the contralateral hearing aid. Thereby an improved beamforming (e.g. providing improved noise reduction) may be provided. Each of the first and second hearing devices (HA1, HA2) comprises a forward path for processing sound signals in the environment of the user wearing the binaural hearing aid system. The forward path comprises the input unit (IU) for picking up sound from the environment of the user and providing one or more electric input signals representative of the sound. The forward path further comprises the beamformer (BF). The beamformer provides a spatially filtered signal $Y_{BF}$ based in the electric input signals at a given point in time. In a binaural mode of operation (initiated by the wake word detection), the input signals include electric input signals (IN1, IN2) from the local hearing aid as well as one or more electric input signals (Inx) from the contralateral hearing aid. In a monaural mode of operation, the input signals to the beamformer (BF) include only electric input signals (IN1, IN2) from the local hearing aid. The forward path further comprises a hearing aid processor (PRO) configured to process an input signal (here the beamformed signal $Y_{BF}$) and to provide a processed output signal (here $Y_G$), e.g. to compensate for the user's hearing impairment. The processed output signal ($Y_G$) is fed to an output unit (OU) for providing stimuli that are perceivable by the user as sound (e.g. representing sound picked up by the input unit (IU)). The input and output units may comprise respective analogue to digital and digital to analogue converters, and respective analysis and synthesis filter banks (to allow processing to be performed in the (time-) frequency domain) depending on the application.

Figure 3B:
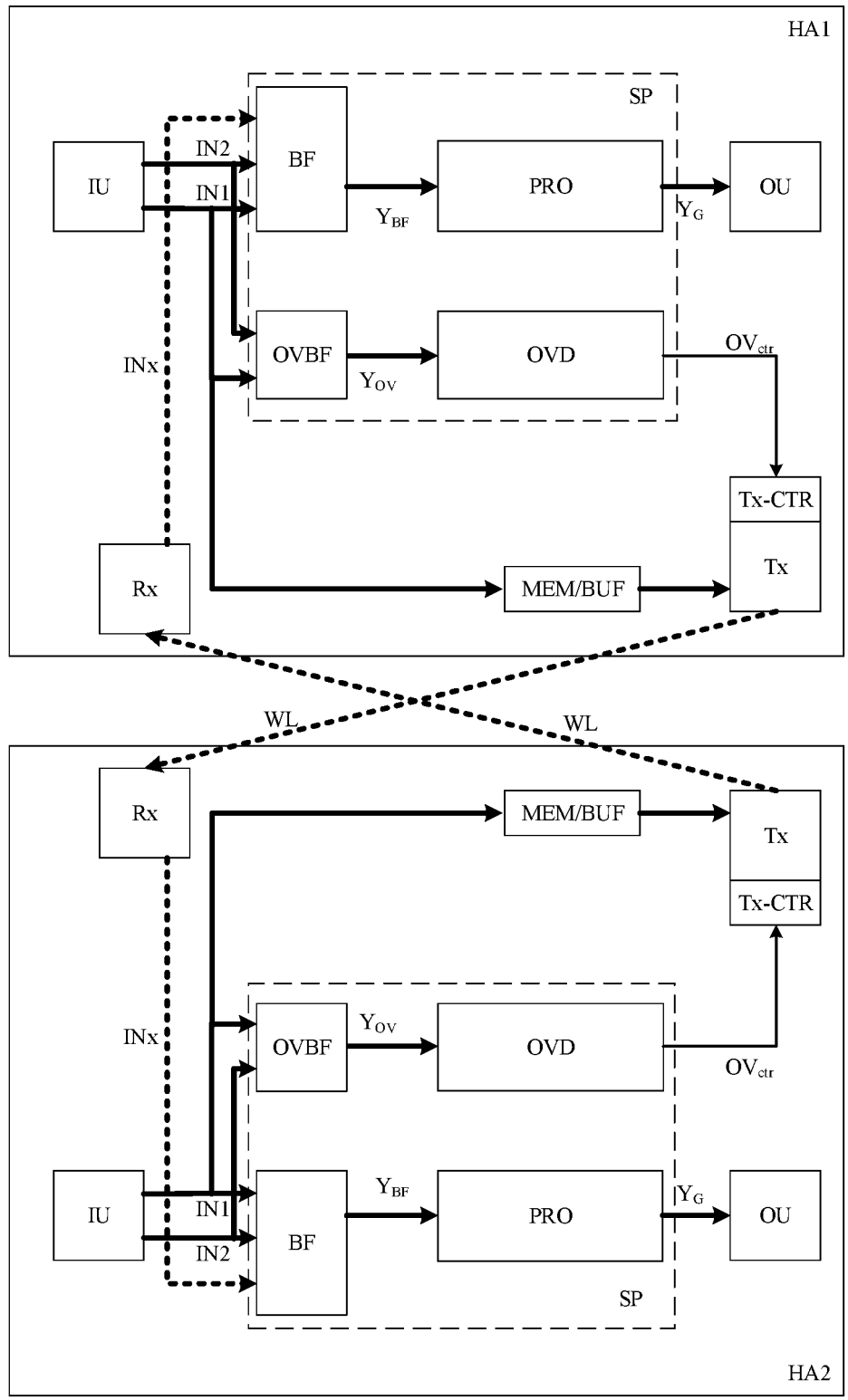
FIG. 3B shows a second embodiment of a binaural hearing aid system comprising first and second hearing aids according to the present disclosure.

FIG. 3B shows an embodiment of a binaural hearing aid system comprising first and second hearing aids according to the present disclosure similar to the embodiment of FIG. 3A, but where the wake word detector (WWD) is substituted by an own voice detector (OVD). The own voice detector (OWD) has the same function as the wake word detector (WWD of FIG. 3A) to enable binaural exchange of signals (transmission and or reception) between the first and second hearing aids (HA1, HA2), in FIG. 3B via own voice control signal $OV_{ctr}$.

In both embodiments, the own voice beamformer (OVBF) is optional. In general, the wake word detector and/ or the own voice detector may be based on a single electric input signal, or they may take two or more electric input signals representing sound as direct inputs, or they may rely on other (additional) inputs, e.g. detector or sensor inputs.

Likewise, the binaural processing unit may not be (or may not only be) a beamformer (BF). In general, the binaural processing unit may e.g. comprise wake word detection or more generally key word detection, and/or own voice detection, e.g. for a voice control interface, to make the respective detections more robust. Further, the binaural processing unit may comprise binaural noise reduction, or binaural speech intelligibility estimation, binaural feedback detection, etc.

Calibrating an Own Voice Beamformer Based on Robust Own Voice Detection.

In an aspect of the present disclosure, it is proposed to use a more robust binaural detection of own voice to trigger a local calibration of an own voice beamformer.

The own voice beamformer weights may be updated while own voice is detected. The advantage of only updating the own voice beamformer weights when the binaural detector detects own voice is that the beamformer weights are only updated in situations where own voice is detected with a high certainty. Thereby power consumption of the hearing aid(s) is optimized while maintaining the quality of own voice estimation.

Figure 4:
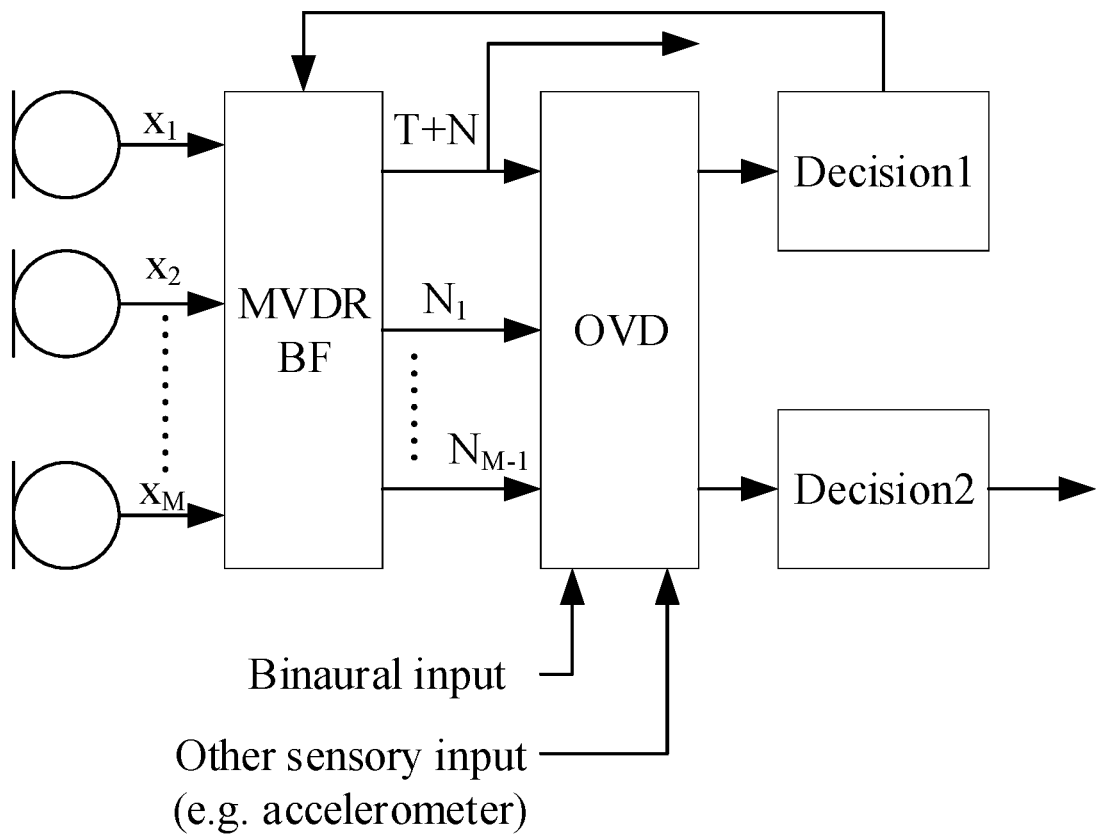
FIG. 4 shows an input stage of a hearing aid according to the present disclosure.

FIG. 4 shows an input stage of a hearing aid according to the present disclosure. The hearing aid comprises a multitude M of input transducers ($M_1, \ldots, M_M$, here microphones). Each of the M microphones provides an electric input signal ($x_1, \ldots, x_M$) representative of sound in the environment of the hearing aid. The M electric input signal ($x_1, \ldots, x_M$) are fed to a beamformer filter (MVDR BF, here an MVDR beamformer), e.g. an own voice beamformer (directed towards the user's mouth) having the user's own voice as its target signal. The parameters of an own voice MVDR beamformer are updated when own voice is detected. The MVDR beamformer output may be used as input to an own voice detector (OVD). An MVDR beamformer implemented as a generalized sidelobe canceller may provide different (output) signals such as a) a target preserving beamformer (T+N) containing a target signal T and (possibly reduced) noise signal(s) N, as well as b) different target cancelling beamformers ($N_1, \ldots, N_{M-1}$). Own voice may be detected based on a comparison between the target preserving beamformer and the target cancelling beamformer. The own voice detector (OVD) may have different decision thresholds, e.g. embodied in a number of different decision blocks (Decision1, Decision2, here two). 'Decision1' is used to decide whether the beamformer parameters should be updated. In this case own voice is only detected when the detector is very sure that own voice is detected (e.g. when an own voice presence probability is larger than a first decision threshold, e.g. ≥70%-80%). The other decision (from Decision2) has a lower (second) decision threshold (e.g. ≥50%-60%), allowing more own voice to be detected, but may also contain more false own voice detections. 'Decision2' may e.g. be used to count the amount of time the person is talking 'Decision2' may e.g. be used to halt a microphone matching system from adapting during own voice as own voice may induce a temporal level difference between the microphones in a hearing aid (both use cases being characterized by the fact that the consequence of false detections is small). In addition or alternatively, the own voice detector (OVD) may as well rely on other input data, such as a signal (cf. 'Binary input' in FIG. 4) from an own voice detector of a device located at the opposite ear, or other sensory input such as accelerometer data (cf. 'Other sensory input (e.g. accelerometer)' in FIG. 4) capable of picking up the user's own voice.

The weights of an MVDR beamformer depend on a) a steering vector d, which comprises the relative transfer functions from a desired direction of interest to the microphones of the hearing aid and b) an estimate of a noise covariance matrix. Where the noise covariance matrix is updated in the absence of the target signal, the steering vector needs to be updated in the presence of the target signal. An MVDR beamformer may as well be implemented as a generalized sidelobe canceller, consisting of a target-preserving beamformer as well as a number of noise estimates (in terms of M−1 target cancelling beamformers, where M is the number of microphones). The beamformer weights of the target-preserving as well as the target cancelling beamformer do as well depend on the steering vector d.

In the special case, where a speaker's own voice is of interest, the steering vector d will contain the relative transfer function between the microphones when the target is own voice (e.g. the relative transfer function between the microphones with respect to a reference microphone). The own voice transfer function will depend on how the hearing instrument is mounted at the ear and it may thus vary over time and it may vary across different individuals. In order to obtain the best possible performance, it is thus advantageous to calibrate the steering vector to how the hearing device is currently mounted.

In order to calibrate the steering vector, voice from the speaker should be present. This calibration may be part of a manual routine, where the speaker is talking during a special calibration program, but it may be cumbersome to initiate such a calibration routine every time the device is mounted. Preferably, the calibration should happen seamlessly e.g. while own voice is detected.

An own voice detector may depend on the parameters of the beamformer which should be calibrated (steering vector d). This dependency is unfortunate, as the detector is dependent on the same parameters, which are updated in dependence of the detector. It is thus desirable if the own voice detector either is dependent on other input.
  e.g. data from an accelerometer capable of picking up vibration from the users own voice (cf. 'Other sensory input (e.g. accelerometer)' in FIG. 4);
  an in-ear microphone located in the ear canal, mainly picking up sound in the ear canal in front of the ear drum (cf. 'Other sensory input (e.g. accelerometer)' in FIG. 4);
  data from another hearing device located at the opposite ear, e.g. an own voice detector based on input form the opposite ear or joint data form both ears (cf. 'Binary input' in FIG. 4).

or the own voice detector used to update beamformer weights has a very high threshold, i.e. only own voice data, where the detector is very sure about its decision is used to calibrate the beamformer parameters (cf. Decision1 in FIG. 4);

or a combination thereof.

The outlined scheme for calibrating an own voice beamformer based on a robust own voice detection can be used independently from other aspects of the present disclosure or it can be combined with the other aspects of the present disclosure.

Figure 5:
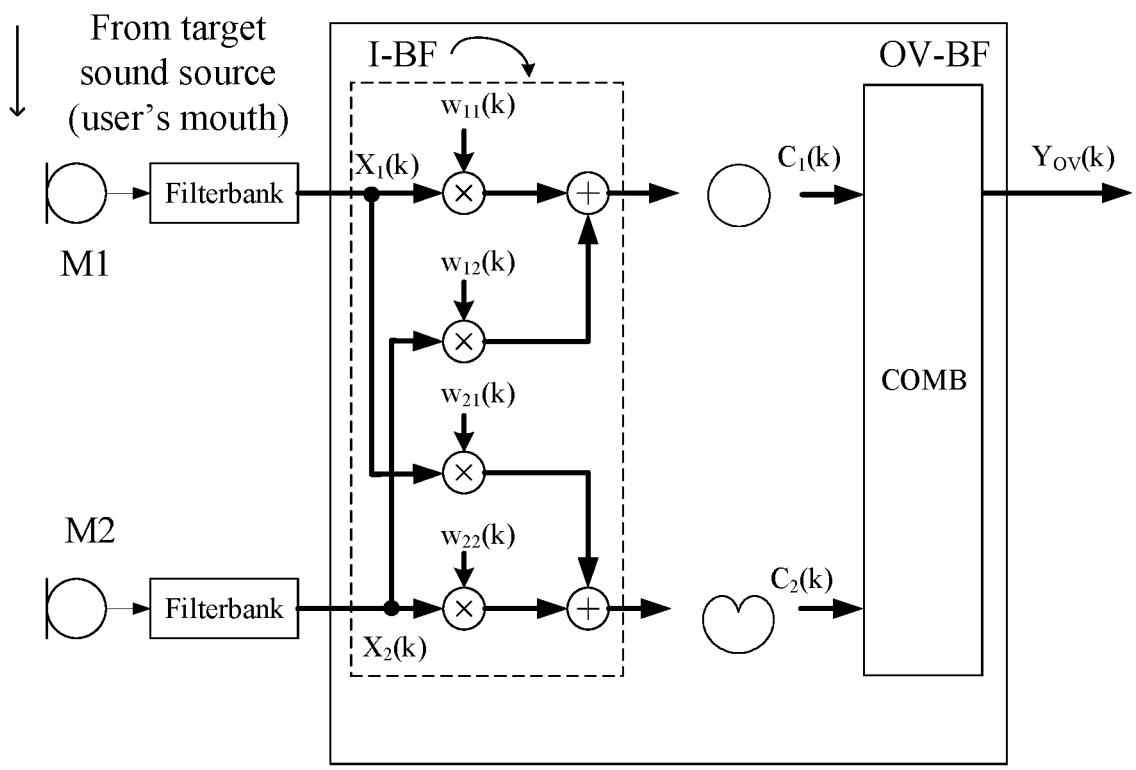
FIG. 5 shows an own voice beamformer configuration wherein the k'th frequency sub-band $Y_{OV}(k)$ is created as a combination of a target cancelling beamformer $C_2(k)$ an omni-directional beamformer $C_1(k)$.

FIG. 5 shows an own voice beamformer configuration wherein the k'th frequency sub-band $Y_{OV}(k)$ is created as a combination of a target cancelling beamformer $C_2(k)$ an omni-directional beamformer $C_1(k)$.

FIG. 5 illustrates an embodiment of a beamformer configuration that may be used to implement an own voice beamformer (OV-BF) for use in a hearing aid (or hearing aid system) device according to the present disclosure. FIG. 5 shows a two-microphone configuration, which is frequently used in state of the art hearing devices, e.g. hearing aids (or other sound capture devices). The beamformers may however be based on more than two microphones, e.g. on three or more (e.g. as a linear array or possibly arranged in a non-linear configuration). An adaptive beampattern (Y(k)), for a given frequency band k, may be obtained by linearly combining two beamformers $C_1(k)$ and $C_2(k)$, cf. combination unit COMB in FIG. 5. $C_1(k)$ and $C_2(k)$ (time indices have been skipped for simplicity), each represent different (possibly fixed, or occasionally updated, e.g. according to specific criteria) linear combinations of first and second electric input signals $X_1$ and $X_2$, from first and second microphones M1 and M2, respectively. The first and second electric input signals X1 and X2 are provided by respective analysis filter banks ('Filterbank'). The frequency domain signals (downstream of the respective analysis filter banks ('Filterbank') are indicated with bold arrows, whereas the time domain nature of the outputs of the first and second microphones (M1, M2) are indicated as thin line arrows. The input block 'IBF' in FIG. 5 provides beamformers '$C_1$' and '$C_2$' based on a linear combination of input signals $X_1$ and $X_2$, using beamformer weights $w_{11}$, $w_{12}$, $w_{21}$, $w_{22}$.

FIG. 5 may represent an adaptive beamformer configuration, wherein the adaptive beamformer in the k'th frequency sub-band $Y_{OV}(k)$ is created by subtracting a target cancelling beamformer $C_2(k)$ scaled by an adaptation factor β(k) from an omni-directional beamformer $C_1(k)$. The adaptation factor β may e.g. be determined as $$\beta = \frac{\langle C_2^* C_1 \rangle}{\langle |C_2|^2 \rangle}$$

The two beamformers $C_1$ and $C_2$ of FIG. 5 are e.g. orthogonal. This is actually not necessarily the case, though.

Acoustic parameters of the own voice beamformer (OV-BF), e.g. a steering vector of the two beamformers $C_1(k)$ and $C_2(k)$—and based thereon—the beamformer weights $w_{11}$, $w_{12}$, $w_{21}$, $w_{22}$, may e.g. be updated (calibrated) in dependence of a criterion. Such criterion may e.g. involve own voice detection and/or wake word detection, e.g. based on local or binaural detection. The criterion may e.g. be dependent on a probability of such own voice or keyword detection being larger than a predefined probability, e.g. larger than 90%, or larger than 95%, etc.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US2019182607A1 (Oticon) 13.06.2019

The invention claimed is:

1. A hearing aid of a binaural hearing aid system configured to be worn by a user, the hearing aid comprising
an input unit configured to provide an electric input signal representing sound,
a wake word detector configured to identify a particular wake word based on said electric input signal, or a signal derived therefrom, and to provide a wake word control signal indicative of whether or not, or with what probability, said wake word is detected, and/or
an own voice detector configured to estimate whether or not, or with what probability, the electric input signal or a signal derived therefrom originates from the voice of the user and to provide an own voice control signal indicative thereof,
transceiver circuitry configured to establish a communication link to another hearing aid of said binaural hearing aid system allowing the transmission of said electric input signal, or a signal derived therefrom, to said other hearing aid and/or the reception of an electric input signal, or a signal derived therefrom, from said other hearing aid,
a pre-processor configured to control said transceiver circuitry in dependence of said wake word control signal or in dependence of said own voice control signal, and
a binaural processor configured to process signals from the hearing aid as well as corresponding signals received from the other hearing aid of said binaural hearing aid system,
wherein said binaural processor comprises
a local trigger stage to enable binaural communication based on
a) the detection of a specific wake word and/or
b) the detection of the user's own voice, and
wherein said binaural processor is configured to provide, respectively,
a binaural wake word control signal in dependence of
said wake word control signal of the hearing aid, and
said wake word control signal received from the other hearing aid; and/or
a binaural own voice control signal in dependence of
said own voice control signal of the hearing aid, and
said own voice control signal received from the other hearing aid.

2. A hearing aid according to claim 1 comprising a buffer configured to store a time segment of said electric input signal or a signal derived therefrom.

3. A hearing aid according to claim 1 wherein the detection of the wake word is dependent on the simultaneous detection of the user's own voice.

4. A hearing aid according to claim 1 wherein the input unit is configured to provide at least two electric input signals representing said sound.

5. A hearing aid according to claim 4 wherein one of the electric input signals is wirelessly received.

6. A hearing aid according to claim 4 comprising a directional system comprising an own voice beamformer configured to focus on the user's mouth, when the hearing aid is mounted on the user.

7. A hearing aid according to claim 6 wherein the own voice beamformer is based on local electric input signals or on binaural signals, or on signals derived therefrom, in dependence of said wake word control signal and/or on said own voice control signal.

8. A hearing aid according to claim 1 configured to provide signals from one or more detectors influencing the value of the wake word control signal or the own voice control signal at a given point in time.

9. A hearing aid according to claim 1 configured to transmit said wake word control signal and/or said own voice control signal to said other hearing aid, and/or to receive a wake word control signal and/or an own voice control signal from said other hearing aid.

10. A hearing aid according to claim 1 wherein said binaural processor is configured to provide a binaural wake word control signal and/or a binaural own voice control signal respectively, in dependence of
said electric input signal, or a signal or signals derived therefrom, of the hearing aid, and
an electric input signal, or a signal or signals derived therefrom, received from the other hearing aid.

11. A hearing aid according to claim 1 wherein said binaural processor is configured to control functionality of said hearing aid in dependence of said binaural wake word control signal and/or said binaural own voice control signal.

12. A hearing aid according to claim 1 wherein said binaural processor is configured to trigger transmission of data from said hearing aid to an external device or system in dependence of said binaural wake word control signal and/or said binaural own voice control signal.

13. A hearing aid according to claim 1 being constituted by or comprising an air-conduction type hearing aid, a bone-conduction type hearing aid, a cochlear implant type hearing aid, or a combination thereof.

14. A binaural hearing aid system comprising respective first and second hearing aids according to claim 1.

15. A binaural hearing aid system according to claim 14 wherein said binaural processor of at least one of said first and second hearing aids is configured to enable transmission of said electric input signal, or a signal derived therefrom, to an external processing device in case said binaural wake word control signal and/or said binaural own voice control signal indicates that said wake word and/or the user's own voice, respectively, has been detected or has been detected with a probability above a certain threshold value.

16. A binaural hearing aid system according to claim 15 configured to provide that a calibration of an own voice beamformer of said binaural hearing aid system is initiated in dependence of a binaurally determined own voice control signal.

17. A method of operating a hearing aid of a binaural hearing aid system configured to be worn by a user, the method comprising
providing an electric input signal representing sound,
identifying a particular wake word based on said electric input signal, or a signal derived therefrom, and providing a wake word control signal indicative of whether or not, or with what probability, said wake word is detected, or
estimating whether or not, or with what probability, the electric input signal or a signal derived therefrom, originates from the voice of the user and providing an own voice control signal indicative thereof,
establishing a communication link to another hearing aid of said binaural hearing aid system allowing the transmission of said electric input signal, or a signal derived therefrom, to said other hearing aid and/or the reception of an electric input signal, or a signal derived therefrom, from said other hearing aid,
controlling said transmission and/or said reception in dependence of said wake word control signal or in dependence of said own voice control signal,
processing signals from the hearing aid as well as corresponding signals received from the other hearing aid of said binaural hearing aid system, and
providing a local trigger to enable binaural communication based on
a) the detection of a specific wake word and/or
b) the detection of the user's own voice, and
providing
a binaural wake word control signal in dependence of
said wake word control signal of the hearing aid, and
said wake word control signal received from the other hearing aid; and/or
a binaural own voice control signal in dependence of said own voice control signal of the hearing aid, and said own voice control signal received from the other hearing aid.

18. A hearing aid of a binaural hearing aid system configured to be worn by a user, the hearing aid comprising
an input unit configured to provide an electric input signal representing sound,
a wake word detector configured to identify a particular wake word based on said electric input signal, or a signal derived therefrom, and to provide a wake word control signal indicative of whether or not, or with what probability, said wake word is detected, and/or
an own voice detector configured to estimate whether or not, or with what probability, the electric input signal or a signal derived therefrom originates from the voice of the user and to provide an own voice control signal indicative thereof,
transceiver circuitry configured to establish a communication link to another hearing aid of said binaural hearing aid system allowing the transmission of said electric input signal, or a signal derived therefrom, to said other hearing aid and/or the reception of an electric input signal, or a signal derived therefrom, from said other hearing aid,
a pre-processor configured to control said transceiver circuitry in dependence of said wake word control signal or in dependence of said own voice control signal, and
a binaural processor configured to process signals from the hearing aid (HA1) as well as corresponding signals received from the other hearing aid (HA2) of said binaural hearing aid system,
wherein said binaural processor comprises
a local trigger stage to enable binaural communication based on
a) the detection of a specific wake word and/or
b) the detection of the user's own voice, and
a binaural trigger stage to trigger a transmission of data to an external device based on
A) a comparison of two local wake word control signals and/or of two local own voice control signals, respectively, or on
B) respective binaurally generated wake word control signals and/or own voice control signals determined from electric input signals, or signals derived therefrom, from both hearing aids of the binaural hearing aid system.

19. A hearing aid according to claim 18 wherein said binaural processor is configured to enable transmission of said electric input signal, or a signal derived therefrom, to said external device in case said binaural wake word control signal or said binaural own voice control signal indicates that said wake word and/or the user's own voice, respectively, has been detected or has been detected with a probability above a certain threshold value.

20. A method of operating a hearing aid of a binaural hearing aid system configured to be worn by a user, the method comprising
providing an electric input signal representing sound,
identifying a particular wake word based on said electric input signal, or a signal derived therefrom, and providing a wake word control signal indicative of whether or not, or with what probability, said wake word is detected, or
estimating whether or not, or with what probability, the electric input signal or a signal derived therefrom, originates from the voice of the user and providing an own voice control signal indicative thereof,
establishing a communication link to another hearing aid of said binaural hearing aid system allowing the transmission of said electric input signal, or a signal derived therefrom, to said other hearing aid and/or the reception of an electric input signal, or a signal derived therefrom, from said other hearing aid,
controlling said transmission and/or said reception in dependence of said wake word control signal or in dependence of said own voice control signal,
processing signals from the hearing aid as well as corresponding signals received from the other hearing aid of said binaural hearing aid system, and
providing a local trigger to enable binaural communication based on
a) the detection of a specific wake word and/or
b) on the detection of the user's own voice, and
providing a binaural trigger stage to trigger a transmission of data to an external device based on
A) a comparison of two local wake word control signals and/or of two local own voice control signals, respectively, or
B) respective binaurally generated wake word control signals and/or own voice control signals determined from electric input signals, or signals derived therefrom, from both hearing aids of the binaural hearing aid system.

21. A hearing aid according to claim 6 wherein the own voice beamformer is based on binaural signals thereby providing a binaural own voice enhancing beamformer providing an enhanced own voice signal, which is transmitted to an external device for further processing.

22. A hearing aid according to claim 21 wherein said further processing includes keyword spotting or further verification of the wake word.

* * * * *